US007363973B2

(12) United States Patent
Nenniger et al.

(10) Patent No.: US 7,363,973 B2
(45) Date of Patent: *Apr. 29, 2008

(54) METHOD AND APPARATUS FOR STIMULATING HEAVY OIL PRODUCTION

(76) Inventors: John Nenniger, 30071 Township Road 254, Calgary, Alberta (CA) T3L 2P7; Emil Nenniger, 80 Second Street, Oakville, Ontario (CA) L6J 3T3

( * ) Notice: Subject to any disclaimer, the term of this patent is extended or adjusted under 35 U.S.C. 154(b) by 234 days.

This patent is subject to a terminal disclaimer.

(21) Appl. No.: 11/063,050

(22) Filed: Feb. 22, 2005

(65) Prior Publication Data

US 2005/0145383 A1    Jul. 7, 2005

Related U.S. Application Data

(63) Continuation of application No. 10/176,093, filed on Jun. 20, 2002, now Pat. No. 6,883,607.

(30) Foreign Application Priority Data

Jun. 21, 2001  (CA)  .................................. 2351148

(51) Int. Cl.
*E21B 43/22*    (2006.01)
(52) U.S. Cl. .................... 166/272.4; 166/266; 166/267; 166/272.7; 166/303
(58) Field of Classification Search ................ 166/266, 166/267, 272.1, 272.4, 272.7, 303
See application file for complete search history.

(56) References Cited

U.S. PATENT DOCUMENTS 2,412,765 A    12/1946    Buddrus et al.

(Continued)

FOREIGN PATENT DOCUMENTS

CA    1059432    7/1979

(Continued)

OTHER PUBLICATIONS

"A New Process (VAPEX) for Recoverying Heavy Oils Using Hot Water and Hydrocarbon Vapour" by Roger Butler, and Igor Mokrys, The Journal of Canadian Petroleum Technology, Jan.-Feb. 1991, vol. 30, No. 1, pp. 97-106.

(Continued)

*Primary Examiner*—David Bagnell
*Assistant Examiner*—David Andrews
(74) *Attorney, Agent, or Firm*—Vidas, Arrett & Steinkraus, P.A.

(57) ABSTRACT

A process for the recovery of hydrocarbons from a hydrocarbon bearing formation having an extraction chamber where the extraction chamber has an extraction surface. The process has the steps of heating a solvent, such as propane, and then placing the solvent into the extraction chamber at a temperature and a pressure sufficient for the solvent to be in a vapor state in the chamber and to condense on the extraction surface. The next step is to produce a liquid blend of solvent and heavy oil and then to separate the solvent from said heavy oil. Then the solvent is purified, before being re-injected into the formation again. The purification step removes less condensable fractions from the solvent to ensure a purity that is high enough to support continued heat transfer at extraction conditions. The pressure and temperature are set to levels to cause less condensable fractions to drain away with the liquid bitumen and solvent blend that is produced, thus mitigating heat transfer poisoning.

18 Claims, 9 Drawing Sheets

U.S. PATENT DOCUMENTS

| | | | |
|---|---|---|---|
| 2,896,725 A | | 7/1959 | Reed |
| 3,351,132 A | * | 11/1967 | Dougan et al. ............. 166/266 |
| 3,512,585 A | | 5/1970 | Allen |
| 3,608,638 A | | 9/1971 | Terwilliger |
| 3,856,086 A | * | 12/1974 | Braden, Jr. ................. 166/403 |
| 3,913,672 A | | 10/1975 | Allen |
| 3,954,141 A | * | 5/1976 | Allen et al. ................. 166/403 |
| 3,990,513 A | * | 11/1976 | Perch .......................... 166/267 |
| 4,004,636 A | | 1/1977 | Brown |
| 4,007,785 A | * | 2/1977 | Allen et al. ............. 166/272.1 |
| 4,007,786 A | * | 2/1977 | Schlinger .................... 166/266 |
| 4,008,764 A | * | 2/1977 | Allen .......................... 166/266 |
| 4,022,277 A | | 5/1977 | Routson |
| 4,127,170 A | | 11/1978 | Redford |
| 4,160,479 A | * | 7/1979 | Richardson et al. ........ 166/267 |
| 4,280,559 A | | 7/1981 | Best |
| 4,344,485 A | | 8/1982 | Butler |
| 4,344,486 A | * | 8/1982 | Parrish .................... 166/272.1 |
| 4,362,213 A | * | 12/1982 | Tabor .......................... 166/267 |
| 4,372,383 A | * | 2/1983 | Ames .......................... 166/266 |
| 4,407,367 A | | 10/1983 | Kydd |
| 4,418,752 A | * | 12/1983 | Boyer et al. ................. 166/267 |
| 4,450,913 A | | 5/1984 | Allen |
| 4,513,819 A | | 4/1985 | Islip et al. |
| 4,531,586 A | | 7/1985 | McMillen |
| 4,550,779 A | * | 11/1985 | Zakiewicz .................. 166/248 |
| 4,560,003 A | | 12/1985 | McMillen |
| 4,673,484 A | * | 6/1987 | Babcock et al. ............ 208/435 |
| 4,697,642 A | | 10/1987 | Vogel |
| 4,753,293 A | | 6/1988 | Bohn |
| 4,836,935 A | * | 6/1989 | Lilienthal ................... 210/788 |
| 4,884,635 A | | 12/1989 | McKay |
| 5,018,576 A | * | 5/1991 | Udell et al. .............. 166/272.3 |
| 5,109,928 A | * | 5/1992 | McCants .................... 166/266 |
| 5,131,471 A | | 7/1992 | Duerksen et al. |
| 5,407,009 A | * | 4/1995 | Butler et al. ................. 166/266 |
| 5,607,016 A | * | 3/1997 | Butler .......................... 166/263 |
| 5,720,350 A | * | 2/1998 | McGuire ................. 166/305.1 |
| 5,771,973 A | | 6/1998 | Jensen et al. |
| 5,899,274 A | * | 5/1999 | Frauenfeld et al. ......... 166/401 |
| 6,230,814 B1 | | 5/2001 | Nasr et al. |
| 6,318,464 B1 | * | 11/2001 | Mokrys .................... 166/252.1 |
| 6,405,799 B1 | * | 6/2002 | Vallejos et al. ............. 166/263 |
| 6,511,601 B2 | * | 1/2003 | McMurtrey et al. ........ 210/634 |
| 6,644,400 B2 | | 11/2003 | Irwin, Jr. |
| 6,662,872 B2 | | 12/2003 | Gutek et al. |
| 6,883,607 B2 | * | 4/2005 | Nenniger et al. ........ 166/272.4 |

| 2003/0015321 A1 | * | 1/2003 | Lim et al. .................. 166/263 |

FOREIGN PATENT DOCUMENTS

| | | |
|---|---|---|
| CA | 1065758 | 11/1979 |
| CA | 1102234 | 6/1981 |
| CA | 1122115 | 4/1982 |
| CA | 1141654 | 2/1983 |
| CA | 1208122 | 7/1986 |
| CA | 2108349 | 11/1993 |
| CA | 2147079 | 10/1996 |
| CA | 2185837 | 3/1998 |
| CA | 2241478 | 6/1998 |
| CA | 2243105 | 8/1999 |
| CA | 2235085 | 10/1999 |
| CA | 2299790 | 2/2000 |
| CA | 2270703 | 10/2000 |
| CA | 2281276 | 2/2001 |
| CA | 2304938 | 2/2001 |
| CA | 2323029 | 4/2001 |
| CA | 2251157 | 5/2003 |

OTHER PUBLICATIONS

"In-Situ Upgrading of Heavy Oils and Bitumen by Propane Deasphalting: The Vapex Process", by I. J. Mokys, R. M. Butler, The Society of Petroleum Engineers, Mar. 1993 publication, pp. 409-424.

"Recovery of Heavy Oils Using Vapourized Hydrocarbon Solvents: Further Development of the Vapex Process", by R. M. Butler and I. J. Mokyrs, The Journal of Canadian Petroleum Technology, Jun. 1993, pp. 56-62.

"Closed-Loop Extraction Method for the Recovery of Heavy Oils and Bitumens Underlain by Aquifers: The Vapex Process", by R. M. Butler and I. J. Mokrys, Oct. 1993.

Effect of Asphaltene Deposition on the Vapex Process: A Preliminary Investigation Using a Hele-Shaw Cell, by S. K. Das, R. M. Butler, The Journal of Canadian Petroleum Technology, Jun. 1994, vol. 33, No. 6, pp. 39-45.

Screening of Reservoirs For Exploitation by Application of Stem Assisted Gravity Drainage/Vapex Processes, by A> K. Singhai, S. K. Das et al, Society of Petroleum Engineers, Inc., Nov. 1996.

Optimum Solvent Injection Strategy for Vapex Operation, S. K. Das.,The Petroleum Society, Paper. 97-63, Jun. 1997.

"Extraction of Heavy Oil and Bitumen Using Vaporized Hydrocarbon Solvents", S. K. Das, R. M. Butler, Petroleum Science and Technology, 15(1&2), 51-75 (1997), pp. 51-75.

High Temperature Naptha to Replace Steam in the SAGD Process, by C. Palmgren, Society of Petroleum Engineers, SPE 30294, pp. 475-485.

* cited by examiner

METHOD AND APPARATUS FOR STIMULATING HEAVY OIL PRODUCTION

CROSS-REFERENCE TO RELATED APPLICATIONS

This application is a Continuation application from Ser. No. 10/176,093 filed Jun. 20, 2002 now U.S. Pat. No. 6,883,607, issued Apr. 26, 2005 the contents of which is hereby incorporated by reference.

FIELD OF THE INVENTION

This patent applies generally to the field of resource extraction and more particularly to the recovery of hydrocarbons for use as fuel. Most particularly this invention relates to the recovery of heavy oils and bitumen from, for example, tar sand deposits.

STATEMENT REGARDING FEDERALLY SPONSORED RESEARCH

Not applicable.

BACKGROUND OF THE INVENTION

Tar sands, such as are found in Alberta, Canada, contain vast reserves of hydrocarbon resources, of the type referred to as heavy oil and bitumen. Heavy oil means crude oil that has high specific gravity and viscosity. These characteristics make it difficult to extract the oil from the typically tightly packed sand formations found in tar sands, because, unlike lighter oil deposits, heavy oil and bitumen do not readily flow.

In the past steam has been injected into the oil-bearing formation to improve the rate of bitumen and heavy oil extraction. There are a number of different stream extraction techniques, including steam cycling, steam floods and more recently steam assisted gravity drainage, commonly known as SAGD. The steam raises the temperature of the oil thereby reducing its viscosity and allowing it to flow more easily. Steam extraction is subject to a number of problems, including heat losses during injection, clay swelling problems, thief zones, water-oil emulsions, capillary surface tension effects and lack of confinement for shallower zones, and therefore is not widely used.

Thermal recovery processes using steam also require using large amounts of energy to produce the steam in the first place, which releases enormous amounts of greenhouse gases such as carbon dioxide. For example, a 100,000 bbl oil/day facility requires 200,000-300,000 bbl water/day to be converted into steam at 200 C. Therefore, if fueled by natural gas, a 100,000 bbl oil/day extraction facility will produce more than 12 million pounds per day of carbon dioxide emissions. With the high cost of natural gas, many operators will use less expensive coal, coke or bitumen. However, such fuels generate about twice as much carbon dioxide emissions per bbl of steam as natural gas. Thus, fuel substitution could potentially double the carbon dioxide emissions to 24 million lbs/day for a 100,000-bopd SAGD facility. In other words, to recover just one barrel of bitumen by steam produces about 240 lbs of carbon dioxide emissions. Therefore, a better recovery technique than steam injection is highly desirable.

Nenniger[1] (1979) first proposed the idea of replacing steam with cold (unheated) solvent vapour such as ethane or carbon dioxide for deep deposits and producing the heavy oil by gravity drainage. However to date there has not been a successful commercial pilot of this cold solvent approach. The predicted production rates from laboratory tests are simply too slow to yield a cost effective treatment. Bench tests[2] using solvent (propane) and sand have shown that production rates can be increased about 20 fold simply by increasing the extraction temperature from 20 C to 90.degree. C. However, Butler2 indicated that propane was unsuitable for direct heating and proposed indirect heating of the propane vapour by co-injection of hot water. However, co-injection of steam or hot water which is heated above grade also suffers from a number of problems, such as countercurrent heat exchange problems during startup, formation damage problems with clays, and non-Newtonian emulsions, capillary pressure issues, water treatment, water supply, and reduced oil permeability due to high water saturations. [1] Nenniger, E. H., Hydrocarbon Recovery, Canadian Patent 1,059,432.[2] See Table 1 and FIG. 7 of Butler et al, A New Process for Recovering Heavy Oils using Hot Water and Hydrocarbon Vapours, JCPT January 1991, pg 100

Canadian patent application 2,235,085 by John Nenniger teaches using a downhole heater to heat and vaporize solvents in situ to quickly grow the solvent chamber. This prior patent application teaches that a re-boiling of the solvent in the hot zone and then re-condensation (reflux) at the bitumen interface can occur, for enhanced recovery. Subsequently, two patent applications of Suncor Energy Inc. 2,304,938 and 2,281,276 were filed which repeat the teachings of using a downhole heat source to set up an in situ reflux cycle for a solvent, comprised of for example a combination of propane and waste CO2.

Another approach is taken in patent application 2,299,790 by John Nenniger, which discloses the latent heat of condensation of several fluids as a function of temperature at their respective vapour pressures. It teaches that to reduce the extraction temperature below SAGD (i.e. to reduce energy costs and greenhouse gas emissions) then the only suitable gases to deliver heat are propane, butane and pentane and the like. Steam has such a low volumetric heat capacity that is unsuitable at lower extraction temperatures. Ethane has such a low critical temperature that it is unable to deliver latent heat above about 30 C. This prior application teaches, for example, that if the Stokes-Einstein law applies, then at 40 C the diffusion coefficient is expected to be about 100 times larger than the diffusion coefficient at 8 C (i.e. original reservoir temperature).

The prior patent application also teaches the expected extraction rate as a function of extraction temperature. For comparison, non-thermal vapour extraction rates (such as Vapex) are about 1 cm/day while SAGD extraction rates (at 200 C) are about 5 cm/day. While the curves of the prior patent application are theoretical and may differ from experimental measurements, the key point is that moderate temperature increases in the bitumen are expected to provide dramatically accelerated bitumen extraction rates. With the added benefit of solvent dilution and deasphalting (as compared to a steam process which is purely thermal), the condensing solvent extraction process taught offers the potential for much higher extraction rates than SAGD at much lower temperatures.

Typically, experiments done on tar sand deposits have been performed on recovered samples. Such recovered samples do not have the same characteristics as the in situ oil, having undergone a temperature and pressure change in the process of recovery. Although various forms of condensing heat transfer such as SAGD, and the Suncor reflux system have been proposed, the effect of light gases which are difficult to condense in an extraction or solvent chamber process have neither been understood nor accounted for. This may be because such light gases are typically lost before samples are placed in laboratory tests, meaning that testing results are obtained from "dead" samples.

SUMMARY OF THE INVENTION

This invention is directed to identifying what mixture of vapours is present in the reservoir, determining the effect such a mixture may have on any condensing solvent heat transfer into the bitumen or heavy oil and implementing process steps and conditions to counter any negative effects. In particular this invention considers the effect of less condensable impurities in the solvent on the heat and mass transfer rates. This invention comprehends establishing process conditions and materials to reduce a vulnerability to heat transfer and/or mass transfer "poisoning" caused by less condensable compounds. Thus, the present invention provides solutions for managing the same whether such compounds are naturally present in the formation, are released during the extraction process into the extraction chamber or are co-injected as impurities with a feed solvent.

The present invention comprehends establishing process conditions for the recovery process for ensuring that heat generated in the thermal process is delivered to the extraction chamber surface in conditions permitting recovery to be optimized. The present invention has greatest effect for heavy oils, but is also applicable to enhancing recovery of less viscous oils.

In one aspect the present invention is directed to a means to produce heavy oil and bitumen at moderate temperatures with simultaneous in situ upgrading. The present invention is directed to a condensing solvent recovery process which has much lower energy requirements relative to steam assisted gravity drainage (SAGD) and simultaneously upgrades the heavy oil in situ. Such a recovery process decreases the cost of extraction while simultaneously increasing the value of the production thereby improving both the operating and profit margins. In addition, such a process provides a more energy efficient extraction technique that reduces the greenhouse gas emissions by more than ⅔ compared to existing SAGD commercial technology.

The present invention is also directed to a recovery process that economically accelerates oil production rate by encouraging the rapid extraction of bitumen. The preferred process accelerates the extraction rate through injection of heated solvent vapour into the recovery chamber formed in the reservoir. As the solvent condenses on a cold bitumen extraction surface it supplies heat and dilution to the bitumen interface to accelerate the extraction. In the most preferred form of the present invention no water or steam is co-injected, avoiding the problems associated with the presence of a liquid water phase in the formation.

The present invention is directed to a process in which the injected solvent is purified enough so that it can substantially condense at the preferred extraction conditions. Purification is desired because trace amounts of less condensable contaminants such as methane, ethane, nitrogen, carbon dioxide, or any other volatile less condensable (at reservoir recovery conditions) components can interfere with the condensing of the solvent and thereby poison the heat transfer. If the heat transfer is compromised the extraction of the bitumen or heavy oil will also be compromised.

A further aspect of the present invention is to choose specific pressure (or temperature) extraction conditions to enhance condensation of the solvent and to mitigate the harmful effect of any such contaminants present in the formation. More specifically the present invention is directed to recovery processes in which one or more of a gas-liquid equilibria as a function of temperature and pressure, extraction rate vs bitumen interface temperature, concentration gradients within the vapour chamber, and bitumen/condensed solvent ratios as a function of extraction temperature are selected and managed to ensure effective heat transfer and thus, effective extraction. In one aspect the temperature and the pressure are set at the high end of a permissible range for the formation, at or below the fracture pressure, but below the critical pressure for the solvent.

The present invention is directed to reviewing the naturally occurring hydrocarbon deposit, and evaluating the amount of dissolved gases present other than the selected solvent. Then operating temperatures and pressures are established to keep the proportion of such other gases present low enough to permit a continuous condensation of feed solvent at desired face temperatures to occur. Thus, the concentration of, for example, less condensable gases present in the formation at extraction conditions is kept to a level such that the heat transfer is permitted to occur at a more or less at a uniform rate. Thus, while some degradation over time is possible, according to the present invention such temperature degradation is limited to an amount at which effective heat transfer can occur.

The present invention is also directed to a process for the recovery of hydrocarbons from a hydrocarbon bearing formation as claimed in claim 1 wherein said solvent is purified sufficiently so that when combined with less condensable compounds released in said formation from said hydrocarbons being recovered the total mole fraction of any non-condensable compounds present is less than 5 mol %.

Further, the present invention is directed to a recovery process in which the solvent vapour will fill the extraction chamber over time, to replace the removed or produced hydrocarbons, and will thus accumulate in the extraction chamber. Much of this solvent can be recovered at the end of the cycle by lowering the pressure and sweeping the chamber with another gas, if desired.

Therefore, among the objects of the present invention are to provide a method and apparatus to extract heavy oil and bitumen which uses condensing solvent vapour, the process being tolerant to contamination from volatile gases naturally present in the reservoir, which would normally poison other solvent extraction processes.

Another object of the present invention is to provide a process that includes the steps of producing solvent from the reservoir, separating solvent from the bitumen, purifying the solvent to reduce concentrations impurities consisting of both higher boiling and lower boiling compounds, and pressurizing, heating and vapourizing the solvent and reinjecting the solvent back into the bitumen reservoir as a vapour.

Another object is to provide a process that operates at elevated temperature and pressure to mitigate the effect of naturally occurring heat and mass transfer poisons in the heavy oil or bitumen reservoir.

Another object is to obtain a solvent purity which has at least a dewpoint temperature within 20, 15, 10, or 5 C of a bubble point temperature at a desired extraction pressure.

Another object is to provide a process and apparatus for a solvent vapour extraction process that operates at pressures just below, at, or just above the reservoir fracture pressure, to promote solvent penetration into the bitumen, increase the interfacial contact area and provide rapid extraction of the bitumen.

BRIEF DESCRIPTION OF THE DRAWINGS

Reference will now be made, by way of example only, to preferred embodiments of the invention as illustrated in the accompanying drawings and in which.

DETAILED DESCRIPTION OF THE PREFERRED EMBODIMENTS

Figure 1:
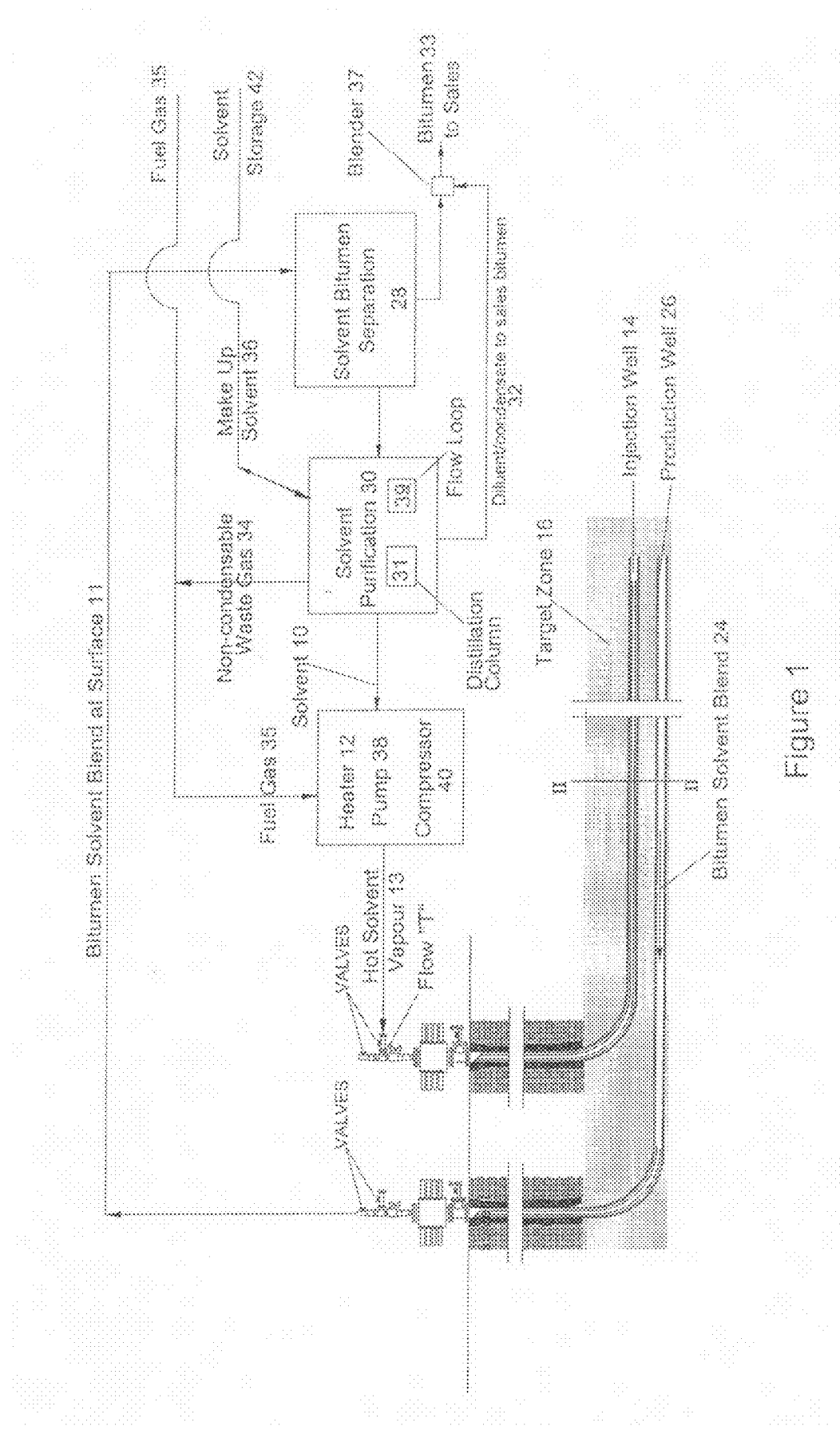
FIG. 1 illustrates a process schematic of the invention, with the injection of a heated vaporized solvent into a heavy oil reservoir to accelerate the draining of bitumen, the production of solvent diluted bitumen and subsequent solvent recovery, purification and recycle.

FIG. 1 shows the general elements for a recovery process according to the present invention. In some respects the elements are similar to that shown in earlier patent application 2,299,790. However, as is explained in more detail below, the recovery process of the present invention includes several key improvements.

FIG. 1 shows a solvent 10 being heated above grade 11 in a heater 12. The hot solvent 13 is injected down the injection well 14 into the recovery reservoir 16. In this specification the term "solvent" means a compound which dissolves into and thus, reduces the viscosity of, naturally occurring hydrocarbons in the recovery formation. The preferred solvent is capable of being heated to a vapour state at recovery pressure so as to condense at a recovery face in the formation. A preferred solvent is a C3 to C5 hydrocarbon such as propane, propylene, butane, pentane or the like. The most preferred solvent is propane. The present invention comprehends that the solvent may be heated either above grade or below grade, as long as the solvent can be heated to a desired temperature at a desired pressure, as explained in more detail below.

The hot solvent 13 (FIG. 2) is placed in a solvent or extraction chamber 18 in a vapour state. The solvent 13 can be so placed through any conventional means, such as through a perforated or slotted casing 20 or the like. The hot solvent vapour flows outward from the casing 20 and condenses on an extraction surface 22 formed by a cold bitumen 23 interface to form a solvent-bitumen liquid blend 24. The solvent-bitumen liquid blend 24 then drains to the bottom of the chamber 18, where it is removed, for example, through a production well 26 and produced to surface 11.

The produced hydrocarbons or bitumen are separated from the solvent at surface 11 in separator 28. The separation of bitumen from the solvent preferably includes one or more flash steps at an elevated temperature. Most preferably, a series of flashes at successively lower pressures and/or higher temperatures are provided to minimize solvent losses in the sales bitumen. The present invention comprehends using a number of flashes that is appropriate to the liquid bitumen solvent blend being recovered. Factors to consider in how many steps to use and at what temperatures and pressures are energy efficiency, reliability, and potential for fouling problems (i.e. deposition of asphaltenes) and or separation problems (foaming etc).

The next step according to the present invention is to purify the solvent for re-use 30. In this sense purify means to remove from the solvent compounds which may have dewpoints at temperatures other than the dewpoint temperature of pure solvent at the same pressure. As will be explained in more detail below, the solvent is purified to keep harmful contaminants including light 34 and heavy 32 contaminants at or below target concentrations at the extraction surface in the formation. Contaminants separated in the solvent purification may be blended into the sales bitumen 33 to reduce diluent requirements to meet pipeline specifications and/or blended into the fuel gas 35.

The next step according to the present invention is to add make up solvent 36 to replace the void volume in the formation created by the extracted bitumen. (Depending on the purity of the available makeup solvent, it may be added either before or after the recycled solvent is purified.)

Finally, the purified solvent is compressed 40, heated 12 and re-injected as a vapour into the reservoir via the injection well. The heat may also be obtained from low temperature "waste heat" produced, for example, by electricity generation.

The process 30 to purify the solvent may include a series of distillation columns 32 to remove impurities. Impurities, in this sense means compounds which alter the bubble point or dewpoint temperature of a solvent vapour in said formation as compared to the dewpoint or bubble point temperature of pure feed solvent. The primary impurities are compounds, which are less condensable than the selected solvent. The term "less condensable compounds" which as used in this specification means compounds (nitrogen, methane, ethane and the like) present in the formation at the extraction surface which are not condensable at the same temperature as the solvent at reservoir pressure. Thus, methane, which condenses at a temperature about 200 C lower than propane is considered less condensable than propane at the same temperature and pressure and is an impurity. This does not of course mean that less condensable compounds are not condensable at other conditions, but merely at the extraction conditions occurring at the extraction surface 22.

Other types of impurities are heavy compounds, which are also undesirable as explained below.

The relative volatility of less condensable compounds vs. the hydrocarbon solvent is larger at low temperatures. This means that it is easier to separate the solvent from the less condensable compounds at lower temperatures. However, low temperatures can also lead to problems with freezing/precipitation of higher molecular weight species. Usually a solvent purification process is designed to eliminate the heavier compounds first (at a higher temperature) and then eliminate the lighter less condensable compounds with a low temperature separation process. The present invention comprehends a purification process having a sequence of distillation columns, but also comprehends semi-permeable membranes, molecular sieves, pressure swing absorption columns, expansion turbines, Joule Thomson cooling or other purification techniques as will be known to those skilled in the art. The selection of which purification process or processes to use will depend upon the availability of resources in the field, the costs of equipment and the like. What is desired according to the present invention is a purification step and equipment that can reliably remove compounds having higher or lower dewpoint or boiling point temperatures than the solvent selected for the recovery process (all at the same pressure), to achieve a desired purity of the solvent for placement into the formation.

According to the present invention the purification process will need to provide consistent purification even though the solvent composition and throughput might vary over time. For example, the solvent production rates from a particular well will increase with time as the chamber grows and the interfacial contact area with the bitumen increases. Individual wells will be periodically shut in for repair and maintenance activities. Thus, the solvent separation and purification process must be tolerant to process upsets and variable flowrates. In some cases it may be desirable to use internal flow loops 39 to assure that a minimum feed rate is always available. Another aspect of the present invention is to provide adequate solvent storage capacity 42 and/or an ability to shut in production, so that the excess solvent doesn't have to be flared (wasted) if an injection well is temporarily shut down.

Figure 2:
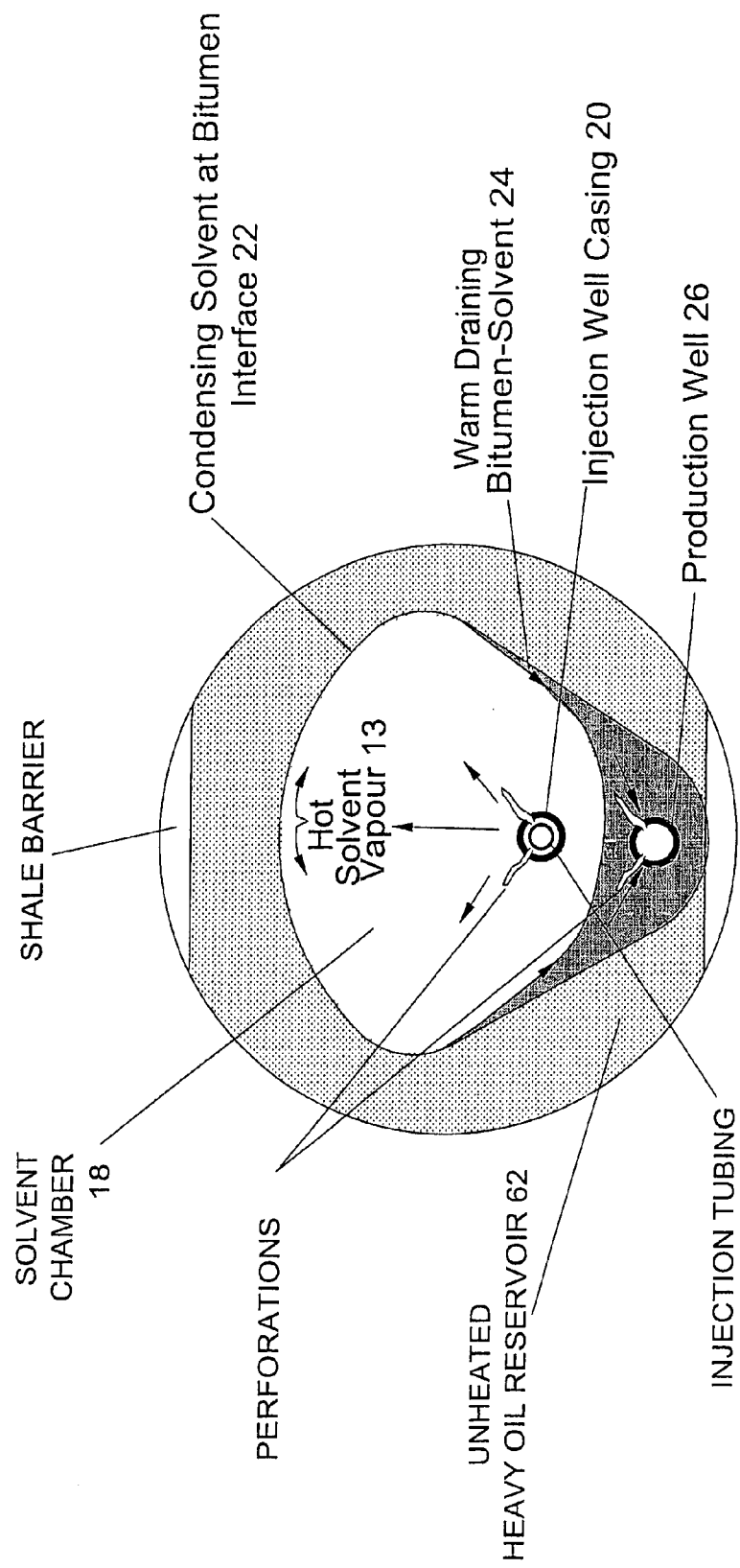
FIG. 2 illustrates a solvent chamber in the hydrocarbon bearing formation (cross section AA of FIG. 1) in more detail.

FIG. 2 shows the downhole environment for the process of the present invention, namely, the solvent or extraction chamber 18 in more detail. The heated solvent vapour 13 flows outward within the chamber 18 to condense on the colder bitumen interface 22 at the perimeter of the chamber 22. As the solvent 13 condenses it releases its heat of vaporization thereby heating the bitumen interface. The condensed solvent partly dissolves and is mixed into the bitumen. The presence of the solvent in the bitumen leads to precipitation of asphaltenes from the bitumen. The asphaltene precipitation upgrades the bitumen via improvements in API gravity and reductions of metals and sulphur and Conradson carbon (i.e. coking tendency). The bitumen-solvent liquid blend 24 drains along the wall 22 or down from the ceiling into the sump. The liquid blend is then drained into the production well 26. The production of liquid bitumen-solvent blend is restricted to minimize solvent gas bypassing in the production well. This is accomplished via a steam trap type control as is currently practiced in SAGD technology.

The benefits of using a medium temperature condensing solvent as the heat transfer mechanism for reducing hydrocarbon are taught in the prior patent application 2,299,790 to John Nenniger. The present invention is directed to establishing process conditions in the formation to permit such benefits to be realized. Central to the present invention is the heat transfer process in the reservoir. Conduction heat transfer through the reservoir matrix is very effective for short distances and totally ineffective for distances greater than 1-2 meters. For example, a cold ceramic coffee cup heats up within a few seconds of being filled with boiling water (heat penetration rate-3 mm/30 seconds=100 microns/second). Compare this observation to 6 months of winter in Canada, which rarely allows the frost line to penetrate more 2 meters into the soil (penetration rate .about.2000 mm/180 days=0.1 micron/second or 1000 times slower). A solvent chamber might be 100 m wide and 30 m tall. Thus, virtually none of the heat delivery from the injection well to the cold bitumen interface can occur via thermal conduction.

The primary mechanism for heat transfer is to have the heated solvent vapour displaced out to the cold bitumen interface (the extraction surface), to then condense and to release its latent heat of condensation at the cold bitumen interface. Even at the extraction surface, conduction heat transfer into the bitumen only occurs within a relatively thin layer extending perhaps a few centimeters beyond the bitumen interface. The present invention therefore recognizes that the success of any vapourized solvent extraction process depends on efficient and continued delivery of the solvent vapour to the bitumen interface. Unless there is an efficient delivery of hot solvent vapour to the bitumen interface the extraction process will stop.

Figure 3:
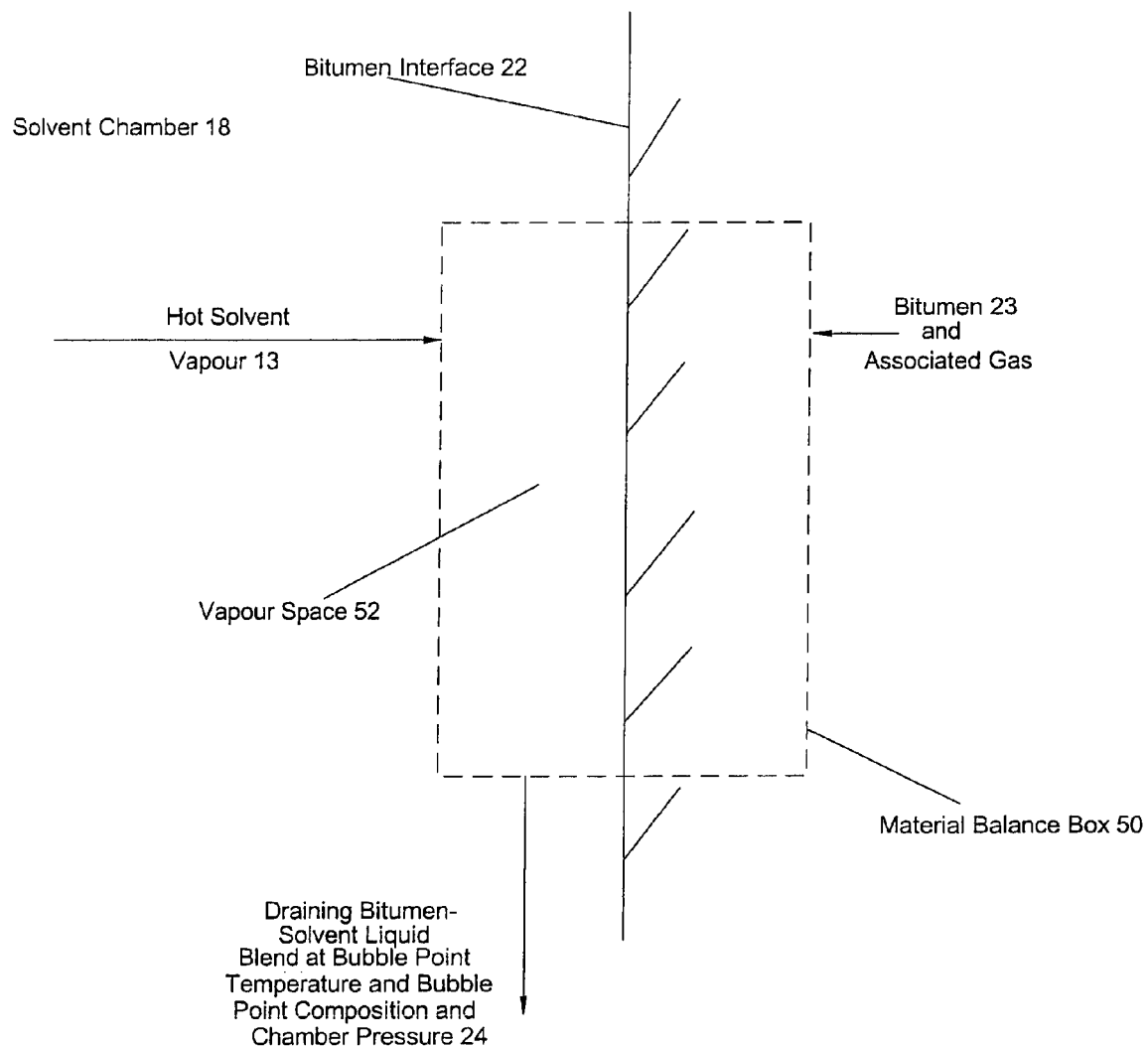
FIG. 3 shows a material balance control volume located at the bitumen interface to represent the extraction of bitumen by the condensing solvent vapour.

FIG. 3 is a schematic of a material balance control volume 50 that straddles the bitumen interface 22. Thus, on one side is the extraction chamber 18 and on the other the in situ hydrocarbon or bitumen 23. This control volume or box 50 is a representation that allows the examination of the heated solvent 13 condensation process at the bitumen interface 22. As the bitumen is warmed, diluted, liquefied and extracted, the bitumen interface moves to the right. Because the box 50 straddles the extraction surface or interface, the box 50 moves along with the interface, as the extraction process progresses. Thus, from the perspective of the box 50, the extraction process consists of solvent vapour entering from the left, bitumen entering from the right and blended bitumen-condensed solvent liquids draining below. For the sake of simplicity, any liquid crossflow across the box (i.e. in from above and out below) can be ignored because any such crossflow cancels out in a material balance.

The box 50 can now be used to understand several aspects of the present invention. Turning to the void space 52 in the box 50, it will fill with a mixture of various compounds in a vapour state. First there will be the solvent vapour. Also there will be a certain small amount of less condensable gases (such as methane) in the feed solvent vapour that enters the box, which are contaminants still present after the purification step. Additionally, there are less condensable compounds naturally emitted by the bitumen as it heats up, that enter the box 50. These sources of less condensable compounds result in a certain vapour concentration of less condensable compounds being present in the vapour mixture in box 50. The less condensable compounds have a slight solubility in the draining bitumen/solvent liquid so some of the less condensable gases are carried away with the produced liquid. The present invention comprehends controlling the rate of accumulation of less condensable compounds within the void 52 of box 50. The present invention also comprehends controlling rate of injection of such less condensable compounds (by setting a desired purity for the feed solvent) as well as controlling the rate of extraction of the same, by manipulating extraction temperature and pressure.

From FIG. 3 it is apparent that all the vapour entering the box leaves as a liquid 24. As the solvent vapour condenses, its volume is greatly reduced. This volume reduction is what creates space for the fresh solvent vapour to enter the box. If the solvent were totally pure and there were no other compounds present, then the process would proceed at a steady rate without any impediments.

However, the feed solvent vapour will typically contain some small amount of a non-condensable gas. If the non-condensable gas is totally insoluble in the liquid blend of condensed solvent and bitumen, then the non-condensable gas has nowhere to go and therefore accumulates in the void 52 in box 50. The flow of solvent vapour to the extraction surface acts to keep the less condensable gases concentrated at the interface. As the solvent continues to condense and drain as a liquid, the non-condensable compounds will continue to be carried into the box in the feed vapour and the concentration of the less condensable gas will continue to increase over time. Eventually there is no room for solvent vapour to enter the box 50 because the vapour phase in the box is filled with impurities such as less condensable gas. At this point, the extraction process stops because the solvent vapour can no longer reach the bitumen. Thus, according to the present invention to achieve a "steady-state" process all of the feed vapour (including less condensable species and solvent) must completely condense to allow more solvent vapour to continue to enter the box 50 to permit the process to continue.

Consider the following examples. What is the impact of a 1 mol % methane contamination in a 99% mol % propane solvent gas flowing outwards to condense on a 8 C bitumen interface at 1000 kPa. (assuming for the moment that no additional less condensable compounds are present in the bitumen). The dewpoint temperature of the solvent is about 26 C and the bubble point temperature is about 22 C. Thus the solvent gas 13 starts to condense at 26 C. However, at 26 C, the methane concentration in the condensed liquids is only about 0.1%. This means that 90% of the methane in the vapour is not removed by the condensing fluids. Therefore, at 26 C the methane concentration increases in the vapour phase in the box 50 (i.e. at the bitumen interface) until the 1 mol % methane originally supplied in the solvent can be entirely removed via the condensing liquids. At 1000 kPa, the methane concentration in the vapour at the bitumen interface will increase and the condensing temperature will drop until the bubble point conditions of 9.5 mol % methane 90.5 mol % propane at 22 C are achieved.

At 9.5 mol % methane and 22 C the draining liquids (propane+bitumen) are able to carry away the 1 mol % methane, 99 mol % propane composition as supplied by the vapour, and thereby maintain the convective flow of fresh solvent gas to the bitumen interface. In other words, enough methane has accumulated in the box 50 that it can be removed at the same rate as it is supplied.

It is significant to note that in the example above, at the 1000 kPa extraction pressure, the methane concentration in the vapour 52 in the box 50 (i.e. at the bitumen interface) is about 10 times higher than the feed concentration in the solvent 13. This shows that very small concentrations of contaminant less condensable gases have the potential to accumulate to very high concentrations at the extraction or condensing surface 22.

Consider the example where the feed solvent gas 13 has 5 mol % impurity contamination by, for example, methane (i.e. feed solvent is 95% propane) and the extraction pressure is 1000 kPa. In this case, the feed solvent mixture (95 mol % propane and 5 mol % methane) has a dewpoint temperature of about 22 C and a bubble point temperature of about 3 C. If the original reservoir temperature is 8 C, then the solvent is unable to fully condense, because the reservoir temperature is above the bubblepoint temperature. Since the solvent cannot fully condense at these conditions, the methane contamination will accumulate in box 50 of FIG. 3 (i.e. at the bitumen interface). At 1000 kPa and 8 C, only about 4 mol % of the draining liquid is methane. Since the feed solvent has 5 mol %, the methane concentration will continue to increase until it reaches 36 mol % in the vapour phase in the box 50 (i.e., at the bitumen interface). At this critical methane concentration, the draining liquid still carries only 4 mol % methane, but the dewpoint temperature of the vapour mixture of propane solvent and methane contaminant (at this point 64 mol % propane and 36 mol % methane) in 52 drops below 8 C. Therefore, the solvent vapour stops condensing on the extraction surface and convective solvent vapour flow into the box ceases. This means that the propane delivery (and hence both heat delivery and diluent delivery) to the bitumen interface is effectively shut down.sup.3. This mechanism of selective enrichment of the less condensable gasses at the bitumen interface means that any gases which are more volatile (i.e. less condensable) than the solvent are very potent heat transfer poisons. .sup.3 Countercurrent gas phase diffusion of methane inwards vs the propane outwards will still allow some propane to reach the bitumen but the rate is negligible (i.e 1000 times slower than convection).

In reality the situation is even worse than the foregoing examples suggest. The tar sands normally have some methane gas associated with them. The gas/bitumen ratios (GBR) are quite low compared to conventional light crudes but have been reported in range of 1-2 for Gulf Surmont up to 7 for Esso Cold Lake. It appears that the deeper the deposit, the larger the GBR. Typical values appear to be about 2-5 m3 vapour per m3 of bitumen for Athabasca bitumen. As the bitumen is mobilized, the associated methane gas will partition between the bitumen phase and the vapour phase. The next example considers the effect of this naturally occurring non-condensable fraction on the heat transfer occurring at the extraction surface.

Consider the Thermal-Solvent and SWEEP processes described by Baker et al. (Canadian patent applications 2,281,276, 2,304,938). These applications describe the use of a downhole heater to strip the solvent out of the bitumen in the extraction chamber and thereby recycle solvent within the formation before the hot bitumen is produced to surface. The insitu recycle processes appear to have the advantages of eliminating the capital expenses of above grade solvent separation, compression and re-injection. The applications teach that the use of heat downhole will preferentially recycle the lighter (i.e. more volatile solvent fractions) back into the solvent chamber. Since methane is the most volatile component and it has negligible solubility in the bitumen at the 150-200 C stripping temperature and 1000 kPa pressure described by Baker et al. it is reasonable to assume that all of the methane originally associated with the bitumen is returned to the solvent vapour chamber.

At these conditions the mol % methane in the feed solvent vapour for the insitu solvent recycle process needs to be considered. In such a process all of the methane originally associated with the bitumen must remain in the chamber. If the initial gas bitumen ratio is 3 m3 methane gas (at standard temperature and pressure (0 C and 101 kPa)) per m3 of bitumen then there will be 3 m3 of methane per m3 of porosity in the chamber. Assuming a chamber temperature of 25 C, then the methane partial pressure will be about 330 kPa (=3.times.101 kPa.times.298K/273K) and the propane partial pressure will be 670 kPa (=1000–330 kPa). Thus, the methane concentration in the feed solvent vapour 13 entering the box 50 is about 33 mol %.

Figure 4:
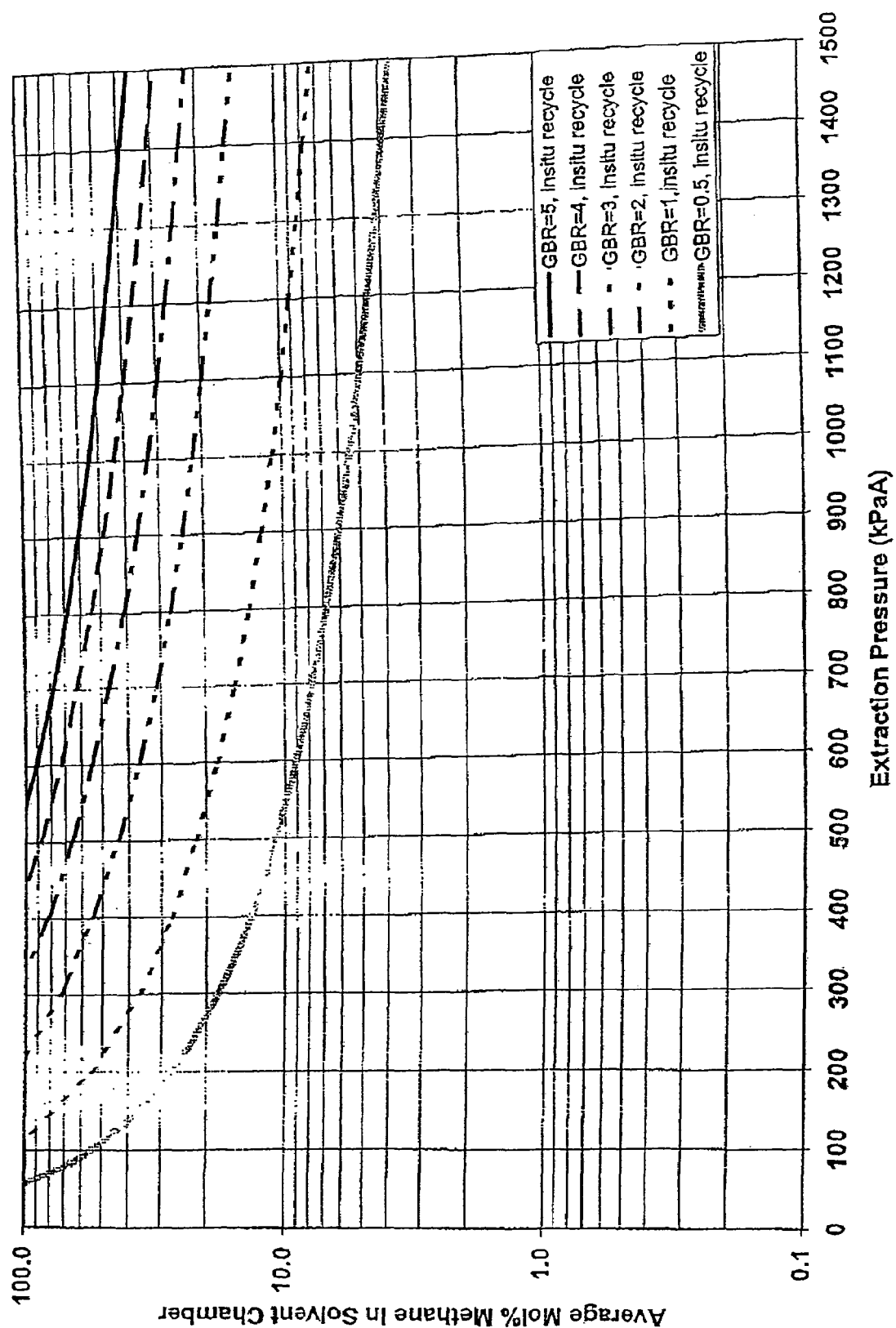
FIG. 4 illustrates the mol % of methane gas in the solvent vapour as a function of an extraction chamber pressure and a gas/bitumen ratio for the reservoir formation for any process that recycles the solvent insitu.

FIG. 4 shows how the methane concentration in the feed solvent vapour varies as a function of extraction pressure and gas bitumen ratio if the solvent is recycled insitu.

There are several important points to note from FIG. 4. First, FIG. 4 is appropriate even if the makeup solvent is pure propane. Consider the insitu solvent recycle process after 100 m3 of bitumen has been produced. Then, for each 1 m3 of bitumen production a supply of 1 m3 of pure propane vapour is needed (at the extraction temperature and pressure). This 1 m3 of pure propane makeup solvent then mixes with 100 m3 of chamber gas at 67 mol % of propane and 33 mol % of methane to give a blend of 67.3 mol % propane and 32.7 mol % methane. In other words, as soon as a small amount of bitumen extraction occurs, the purity of the makeup solvent becomes irrelevant and the methane concentration in the chamber is entirely determined by the gas bitumen ratio.

Now consider that the earlier calculations showed that a methane concentration above 5 mol % in the feed (i.e. entering our box of FIG. 3) was "lethal" (i.e. stopped the convection flow of solvent vapour to the bitumen interface) at 1000 kPa. FIG. 4 shows that at typical Athabasca gas-bitumen ratios (also known as GBR) of 2-5 and at 1000 kPa that the average mole fraction of methane in the solvent will range from 22 to 55 mol % even if the makeup solvent is absolutely pure propane. FIG. 4 shows that at 1000 kPa, the gas/bitumen ratio has to be smaller than 0.5 for insitu solvent recycle to work. With typical gas/bitumen ratios of 2-5, insitu solvent recycle processes are unable to deliver heat to the bitumen interface via condensing solvent. The insitu solvent recycle process is futile because there is no possibility of controlling the less condensable gas concentration in the chamber.

Figure 5:
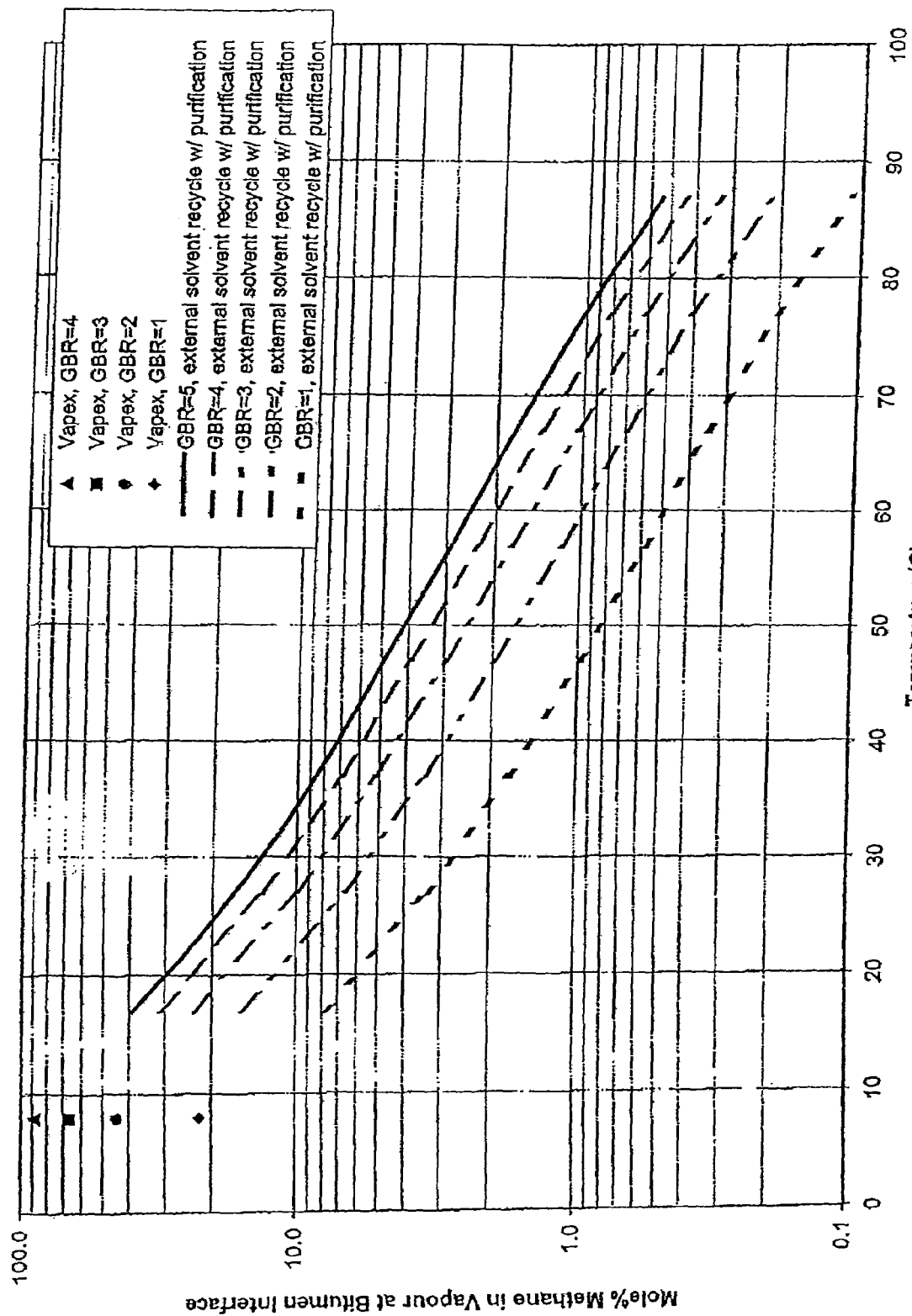
FIG. 5 shows the mol % of less condensable gas at the bitumen interface as a function of extraction pressure and gas/bitumen ratio (assuming the injected solvent is pure)

According to the present invention the condensed solvent is produced to the surface along with the extracted bitumen 11. The solvent is separated 28 and purified 30 so that relatively pure solvent 13 can be re-injected into the chamber. There still exists a source of methane contamination in the recovery process. Methane enters the box 50 (because it is associated with the bitumen) upon being released from the bitumen. FIG. 5 shows the concentration of methane in the vapour phase 52 inside of the box 50 (i.e. at the bitumen interface) as a function of the extraction temperature and gas/bitumen ratio (GBR). For clarity, the present invention is identified as "external solvent recycle with purification" to distinguish it from the insitu solvent recycle process of the prior art. The calculations presented in FIG. 5 are based on a correlation using the published methane solubility in bitumen data of Mehrotra and Srvek.

FIG. 5 shows that as the gas/bitumen ratio increases the concentration of methane at the bitumen interface increases. However, the more interesting result is that as the extraction temperature increases, the mole percent of methane at the interface decreases quite rapidly (i.e. the curves slope quite sharply down to the right). This dramatic improvement in reduction of the non-condensable compound at higher temperatures is somewhat surprising. However, the reason for the temperature sensitivity is a consequence of the heat balance. The latent heat (kJ/kg) of the condensing solvent is reduced at higher temperatures so more solvent must be condensed to deliver heat at higher temperatures. Furthermore, as the extraction temperature increases, more energy is required to heat a given volume of reservoir (bitumen). Thus, the solvent/bitumen ratio in the draining liquids is much higher at high temperatures. However, the most important reason is that the propane vapour pressure is much higher at high temperatures so that the methane mol fraction in the vapour mixture at the bitumen interface is effectively diluted. The net effect of all of these factors is that methane removal via draining liquids from the bitumen interface is very effective at high extraction temperatures (pressures).

Figure 7:
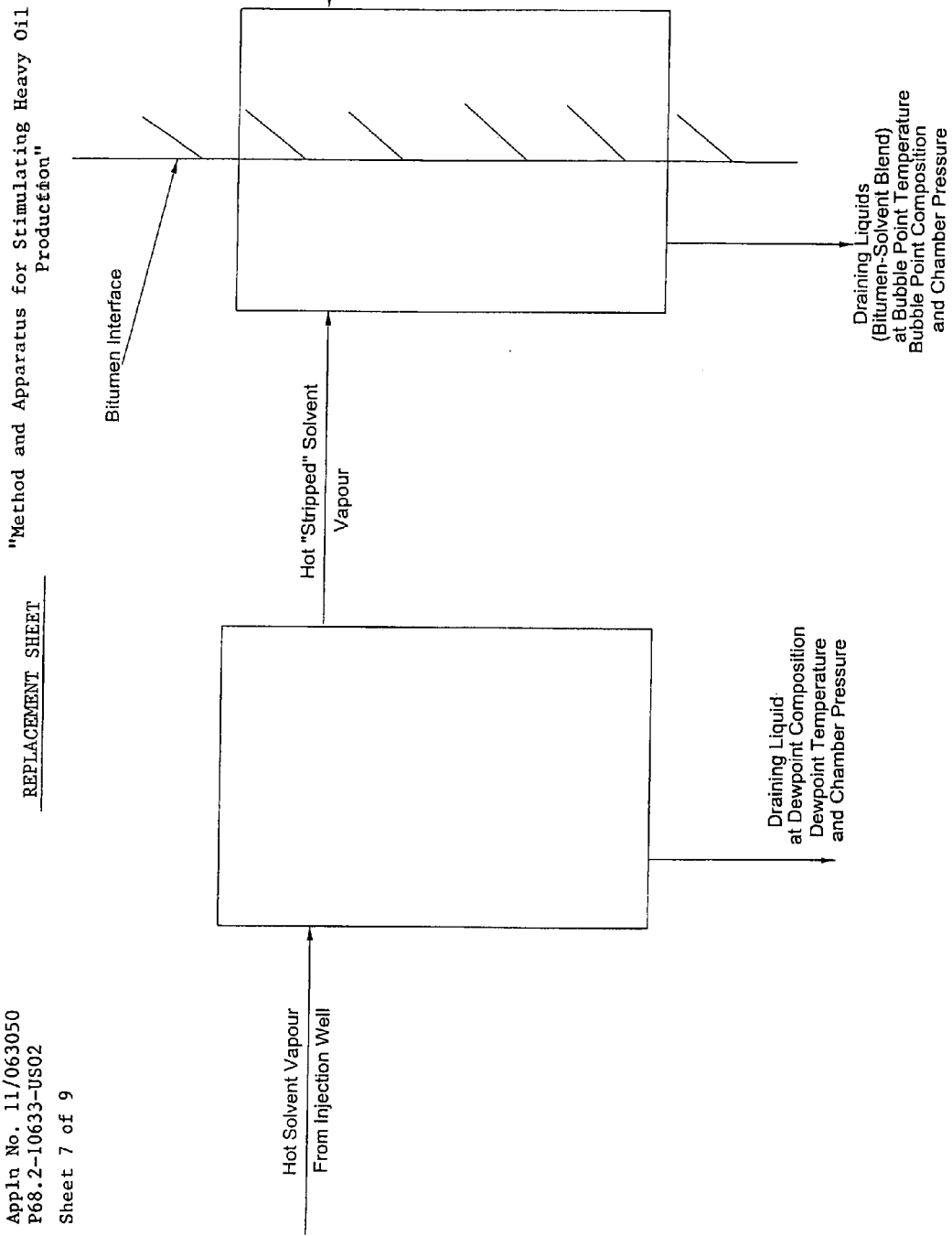
FIG. 7 shows material balance control volumes to illustrate the "stripping" of a solvent gas as it travels from the injection well outwards to the bitumen interface, where the stripping is due to the dewpoint temperature of the vapour mixture being higher than its bubble point temperature at the chamber pressure

While FIG. 5 shows that higher temperatures (and pressures) can be very beneficial to reduce the accumulation of non-condensable gases from the vapour mixture at the bitumen interface, there are also other compelling reasons to use relatively high pressures (and temperatures) according to the present invention. It is believed that the failure of steam and fireflood pressure drives as bitumen extraction techniques was due to severe bypassing. FIG. 7 shows material balance control volumes to examine the effect of a temperature gradient within the extraction chamber (i.e. the solvent dewpoint temperature is higher than its bubble point temperature at the chamber pressure). In a pressure drive, the drive fluids are usually very mobile compared to the bitumen so they tend to bypass the bitumen without mobilizing it. On the other hand, if the extraction takes place at or below reservoir pressure then there is no tendency to bypass.

However, for gas bitumen ratios above 4 m3/m3 at 1000 kPa and 8 C (i.e. at original reservoir conditions) then some gas phase is likely present in the reservoir. The gas phase would probably occur as small "bubbles" and could possibly provide "compressibility" if the solvent vapour chamber pressure is maintained above original reservoir pressure. In the case of a water film on the surface of the reservoir sand, immobile bitumen and some slight compressibility due to a gas phase, we also have the possibility to develop a "leak path" allowing the solvent to flow into and thereby penetrate the bitumen interface. Undersome circumstances (high gas bitumen ratio and very high chamber pressures) it is also believed that the accumulated methane at the bitumen interface could even be pushed back into the bitumen, so that the bitumen extraction face can be directly exposed to essentially only the feed condensing solvent vapour. Furthermore, instead of static diffusion to transport the solvent into the bitumen there is also a possibility of using convection mixing to increase the interfacial contact area and accelerate the mass transfer rates. The beneficial effect of faster solvent penetration would be most noticeable at pressures close to the formation frac pressure. Thus, according to the present invention there are a number of reasons to operate the recovery process towards at the highest feasible pressure. In this sense the highest feasible pressure means a pressure which is high enough to take advantage of the foregoing benefits without creating a host of fresh problems. Thus, a preferred range is within about 25% of the frac pressure with the most preferred being within about 10% of the frac pressure.

The temperature sensitivity of FIG. 5 can be also extrapolated back to the original reservoir temperature (8 C for this example). This provides us a point of comparison with non-thermal solvent vapour extraction processes such as Vapex. Obviously, concerns over the condensing heat transfer coefficient are irrelevant for a non-thermal process such as Vapex. However, Vapex is vulnerable to another type of poisoning, i.e. mass transfer poisoning. In this case, the methane concentration inside the box 50 of FIG. 3 (i.e. at the bitumen interface) accumulates and thereby reaches elevated concentrations. These elevated methane concentrations reduce the partial pressure of the solvent vapour at the bitumen interface and prevent the solvent from efficiently contacting the bitumen. If the gas/bitumen ratio is high enough, then the partial pressure of the methane could actually be higher than the chamber pressure (i.e. about propane at dewpoint pressure at 8 C). Under these conditions, the extraction of bitumen could generate a convective flow of methane gas into the chamber, tending to raise the chamber pressure and/or preventing the inflow of solvent vapour via the injection well. FIG. 5 shows that for an Athabasca bitumen reservoir at 8 C, and a gas/bitumen ratio of 3, the methane concentration at the interface in a Vapex process is about 67 mol %. The vapour pressure of pure propane at 8 C is about 640 kpaa. With 67 mol % methane, the partial pressure of propane at the bitumen interface is only 210 kPaa. Butler has published some data on the effect of the solvent partial pressure on the extraction rate. Based on Butler's data (Society of Petroleum Engineers paper #25452, FIG. 2), one might expect an 80-95% reduction of the bitumen extraction rate, due to the methane poisoning from the bitumen. Since a gas/bitumen ratio of 3 is towards the low end of the expected range of values, it is clear that the presence of methane gas will have a major negative impact on the economics and feasibility of Vapex. It will be appreciated by those skilled in the art that the present invention, of setting desired temperature and pressure conditions reduce these problems.

The present invention also comprehends using a periodic blowdown or venting of the vapour mixture from the solvent chamber help avoid the accumulation of non-condensible gases at the bitumen interface. Blowdown would allow methane to be produced to surface as a gas. Also, blowdown might be warranted if the methane, for example, tended to accumulate in the upper portion of the chamber due to relative buoyancy effects. Methane is lighter than propane and thus over time might tend to float over the propane at the upper part of the chamber. It may be desirable to periodically vent the methane from the top of the chamber to ensure that the condensing solvent has access to the full solvent extraction surface. Blowdown would also reduce the chamber pressure so that subsequent propane vapour injection was feasible.

However, it will be appreciated by those skilled in the art that blowdown has some drawbacks. The methane gas preferentially accumulates at the bitumen interface so the methane has to travel the furthest possible distance to reach the injection well. Thus, one would expect the methane concentration in vented gas to be small until the chamber blowdown is almost complete.

One of the issues addressed by the present invention is to establish reasonable solvent purity specifications. The data shown in FIG. 5 assume that the injection solvent is pure. However, the cost of the solvent purification is related to the purity so the cost to achieve 99% purity may be 10 times higher than the cost to achieve 90% purity. The actual cost of the purification process will also depend other factors such as throughput, contamination levels, yield (i.e. amount of solvent rejected in the waste gas stream) and the like. The appropriate specification for solvent purity will involve a tradeoff between several factors including bitumen extraction rate, solvent purification costs, and perhaps solvent inventory cost. As will be appreciated by those skilled in the art, these costs will fluctuate meaning that a range of solvent purities will likely be put into practice. However, the present invention comprehends all solvent purities that are able to efficiently extract bitumen from tar sands in a continuous process.

Figure 6:
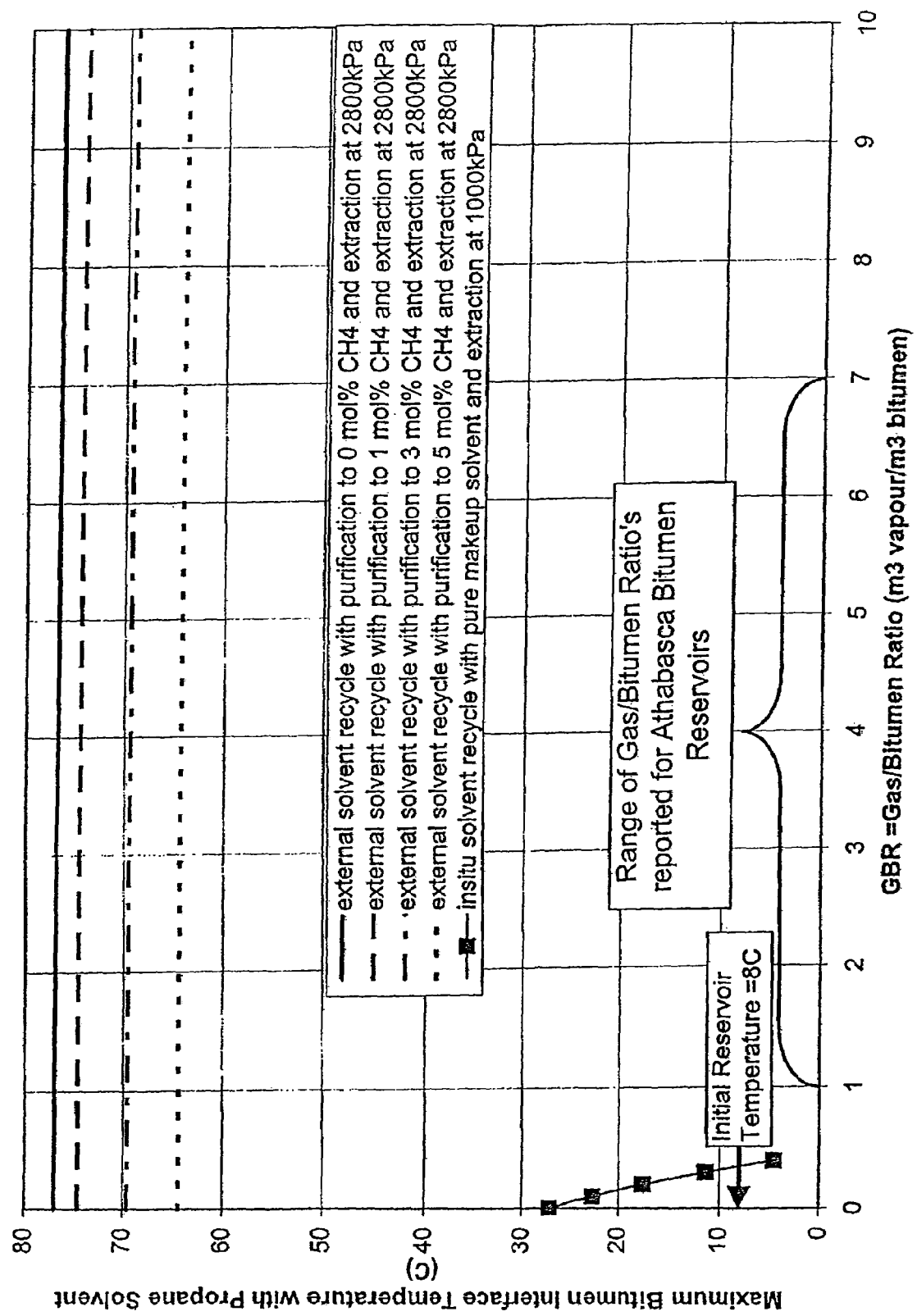
FIG. 6 shows a bitumen interface temperature as a function of gas bitumen ratio and the amount of methane contamination in the injected or feed solvent for various solvent vapour extraction processes.

Consider injection of a "practical" solvent vapour which is reasonably pure, but which does include some methane contamination. By way of example only, contamination of 0%, 1% 3% and 5% are shown in FIG. 6 (as compared to the 22-55 mol % methane for an in situ recycle process). FIG. 6 shows the bubble point temperature (=maximum bitumen interface temperature) as a function of methane concentration in the recycled solvent vapour and the gas/bitumen ratio in the reservoir. For the purposes of this calculation, we assumed similar conditions to the insitu solvent recycle process, namely, 8 C initial reservoir temperature, about 120 m of overburden, 1000 kPa reservoir pressure and a maximum feasible operating pressure (i.e. just below frac pressure) of 2800 kpaa.

FIG. 6 also shows that the impact of the gas/bitumen ratio in our solvent vapour extraction process is relatively inconsequential. As gas bitumen ratios increase from 0 to 5 (m3/m3) the vapour mixture bubble point temperature at the extraction interface is only reduced by about 1 C. At first, this surprising result seems unreasonable. However, as noted above in FIG. 5, operating the extraction process at higher temperatures and pressures mitigates the effect of the methane gas coming out of solution from the bitumen. According to the present invention, operation at higher temperatures and pressures will increase the solvent/bitumen ratio in the draining liquids. Thus, at preferred operating conditions the amount of methane contamination carried into the box 50 via the feed solvent vapour is much larger than the amount of methane introduced into the box via the bitumen. Thus, the insensitivity of the present invention to gas/bitumen ratio in FIG. 6 is correct.

FIG. 6 also shows that the present invention tolerates fairly high methane concentrations, a 5 mol % methane level in the injected gas only reduces the bubble point temperature from 77 C to about 64 C (i.e. a decrease of 13-14 C). This is an important result, because it shows that the present invention is relatively tolerant to methane contamination. Reasonable heat transfer rates can be achieved without incurring excessive solvent purification costs.

FIG. 6 also shows the bubble point temperature (which is the same as the bitumen interface temperature) for an extraction process that recycles the solvent insitu at 1000 kPa as described by Baker et al. Even if the makeup solvent is pure, all the methane is trapped within the chamber and the extraction pressure is relatively low. Therefore, the bubble point temperature drops below the reservoir temperature if the gas/bitumen ratio exceeds 0.4. This result means that the insitu solvent recycle processes are unable to deliver any heat to the bitumen interface if the gas bitumen ratio exceeds 0.4.

FIG. 6 also shows the gas/bitumen ratios for typical Athabasca bitumen in the range of 2-5. Clearly, the insitu solvent recycle process is unsuitable for typical Athabasca reservoir conditions. In comparison, the present invention uses a condensing solvent process with solvent recovery, purification and re-injection, which is relatively insensitive to the typical gas/bitumen ratios. Furthermore, FIG. 6 shows that the present invention tolerates reasonable levels of methane contamination in the injected propane, so the cost of solvent purification need not be excessive.

Although the discussion above is referenced to methane it will be understood that the foregoing discussion applies to all other light fractions which may be similarly present either in the feed solvent or in the bitumen being recovered. Thus, the solvent purity for other contaminants is also a consideration. Methane is likely to be the dominant "poison", and some degree of poisoning is inevitable because methane is naturally associated with the bitumen. However, in any process that recycles the solvent, it is possible that other trace impurities or contaminants may also accumulate within the solvent over time. Consider specifications for ethane-ethylene as a function of gas/bitumen ratio and extraction temperature. Since ethane-ethylene are more difficult to separate from the propane than methane, the ethane-ethylene concentrations might eventually become excessive over time even if a target methane purity specification was achieved. The present invention comprehends managing solvent purity, extraction temperature and pressure and setting an overall bubblepoint specification which accounts for the effects of all contaminant gases including nitrogen, argon, carbon dioxide, hydrogen sulphide, or the like.

Gases that are heavier than the preferred propane solvent, such as butane, pentane, hexane, heptane, benzene etc. can also be a source of contamination in the recycled solvent. The "heavies" will tend to raise the dewpoint temperature at the chamber pressure (i.e. extraction pressure). In other words, the presence of heavy contaminants in the injected solvent will require higher temperatures to keep the solvent as a vapour. The solvent vapour will begin to condense and release its latent heat at the dewpoint temperature but the bubble point considerations at the bitumen interface (FIG. 3) are still valid (i.e. we must be at bubble point conditions at the bitumen interface in order to supply solvent to the bitumen interface). This means that there will be a temperature gradient within the chamber, which is likely to have certain consequences.

FIG. 7 shows schematic material balance control volumes for the situation where the dewpoint temperature is above the bubble point temperature. FIG. 7 shows that the partial condensation of the solvent as its temperature drops below the dewpoint will tend to strip (i.e. preferentially remove) the heavies from the solvent vapour. What are the consequences? Let us consider an injected solvent vapour that contains 2 mol % butane and 2 mol % methane (96 mol % balance is propane). We maintain the chamber pressure at the maximum allowable 2800 kPaa. The dew point temperature is 78 C and the bubble point temperature is 73 C. The worst case thermal efficiency within the chamber is about 93% (=100*(73−8)/(78−8)). This means that about 7% of the latent heat of condensation could be wasted heating previously extracted reservoir sand far from the bitumen interface. Thus, referring to FIG. 7, we can estimate that a maximum of 7 weight percent of the solvent vapour condenses within the solvent chamber and that the remaining 93% condenses at the bitumen interface. At 7% condensation, the condensed liquid will have about 4.5 mol % butane, and only 0.5 mol % methane (balance 95% propane), so the vapour that flows outward to the bitumen interface has 2.1 mol % methane, 1.8 mol % butane (balance 96.1 mol % propane). Thus, the solvent gas that eventually reaches the bitumen interface has an elevated mol percent of methane (2.1%) than the injected solvent vapour (2%). This increase in the methane concentration reduces the bubblepoint temperature (i.e. bitumen interface temperature) by about 0.3 C (to 72.7 C).

According to the present invention the presence of "heavies" in the solvent vapour is undesirable and will tend to reduce thermal efficiency by raising the dewpoint temperature and by also indirectly reducing the bubblepoint temperature of the vapour at the bitumen interface. Again the precise specification for solvent vapour purity will depend on a detailed analysis which considers purification costs, thermal efficiencies, energy costs, and extraction rates etc.

According to the present invention the most preferred recovery process will include considering all of the contaminant gases in the injected solvent, as well as contribution from the gases associated with the extracted bitumen. Once these are known, then purity requirements for the solvent can be established which ensures an overall bubble point temperature that is suitable for effective recovery of the hydrocarbons.

Thus the present invention comprehends managing the purity of the feed solvent to maintain a temperature differential or band between the bubble point temperature and the dew point temperature of the vapour mixture of no more than a predetermined amount, at a desired extraction pressure. The preferred predetermined amount will vary depending upon the trade off between purification costs and energy costs. The smaller the temperature difference between the two, the more energy is directed into heating the bitumen but the more pure and thus more expensive the feed solvent needs to be. For most applications a temperature band of about 30 degrees or less is suitable and the most preferred temperature band is about 10 degrees or less.

Figure 8:
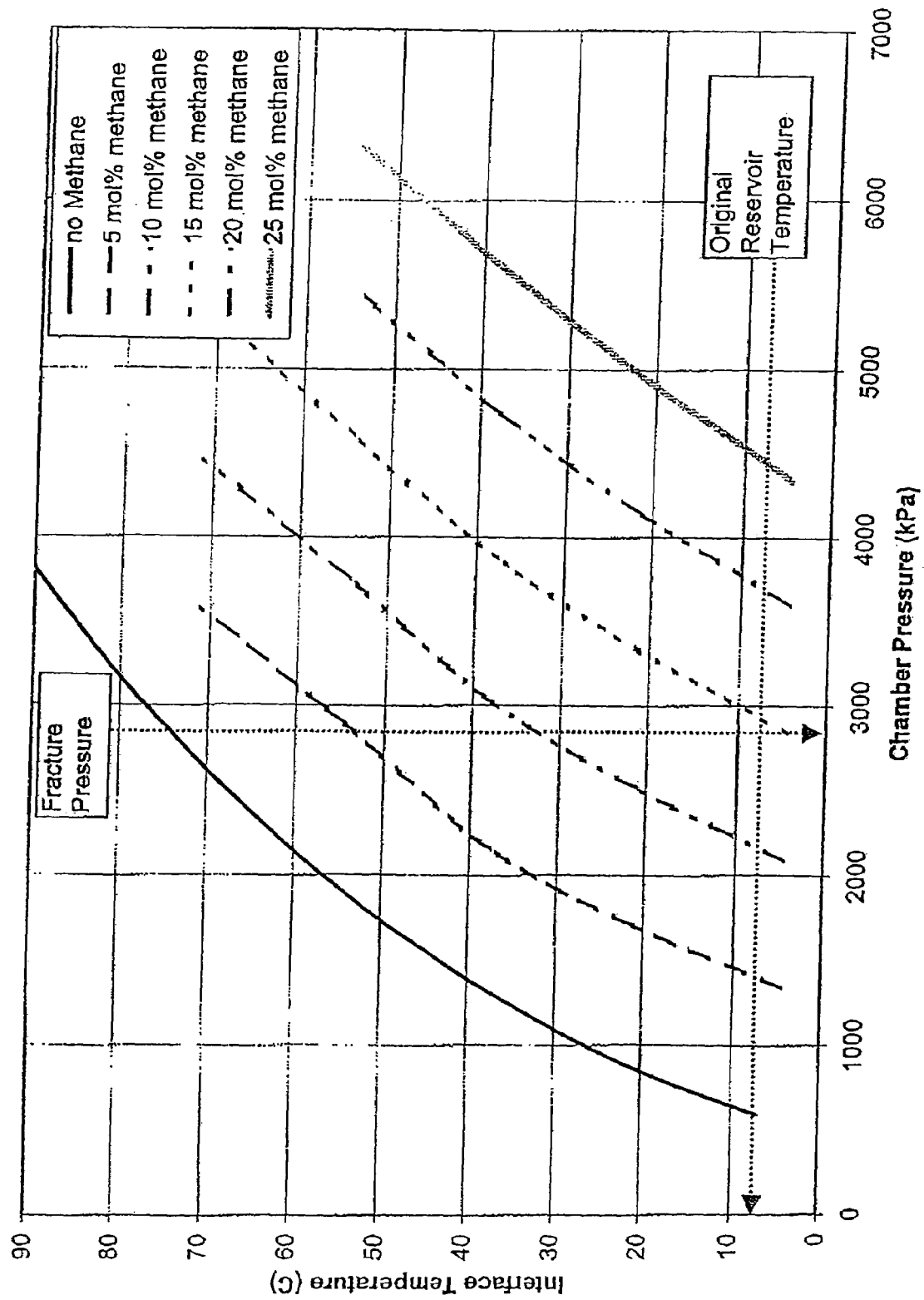
FIG. 8 shows the bubble point temperature of a propane/methane vapour mixture as a function of pressure and mol % methane.

FIG. 8 shows the bubblepoint (i.e. bitumen interface) temperature as a function of chamber pressure and mol % methane concentration in the propane solvent. This figure was made using the methane-propane phase diagrams published in the Handbook of Natural Gas Engineering so it does not take into account either the gas bitumen ratio or the methane solubility in the bitumen. However, because the present invention comprehends a relatively high solvent ratio (i.e. m3 of solvent to m3 of bitumen) FIG. 8 is appropriate except for low pressures and high gas bitumen ratios. This figure shows the maximum interface temperature is sensitive to the mol fraction of methane in the recycled gas. Each 1 mol % of methane contamination in the re-injected or feed solvent reduces the bubblepoint temperature by about 4 C. FIG. 8 also shows that the condensing heat transfer is not possible if the pressure is constrained (by for example a frac pressure) and the methane concentration is too high. For example, with a maximum allowable pressure of 2800 kPa, the methane concentration the re-injected solvent 13 must be below 15 mol %, or else the bubble point temperature is below the reservoir temperature. Similarly, if the pressure constraint is 2800 kPa and the interface or extraction surface temperature desired is 70 C, then the methane concentration in the re-injected solvent must be less than about 2 mol %.

Figure 9:
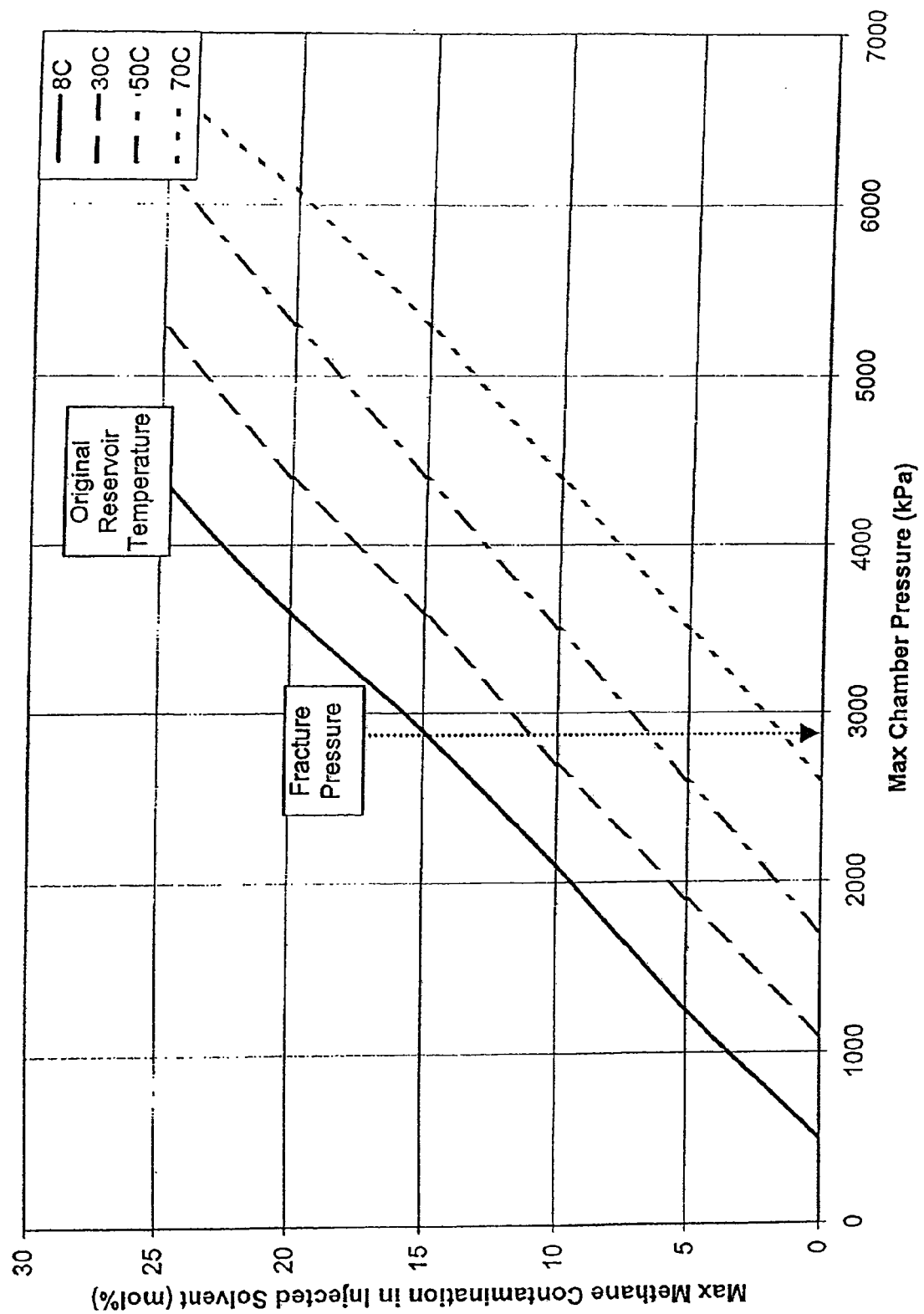
FIG. 9 is similar to FIG. 8 except the maximum mol % methane is plotted as a function of chamber pressure at various bubble point temperatures.

FIG. 9 shows similar data except that the maximum mol percent methane is plotted as a function of chamber pressure for various bitumen interface temperatures (i.e. bubblepoint temperatures). This figure shows that to keep the bubblepoint temperature consistent, the chamber pressure must be raised by about 160 kPa for each additional 1 mol % methane in the injected solvent.

The heat transfer coefficient for the condensing solvent is also affected by the amount of methane concentration in the injected or feed solvent. The coefficient is expected to scale with the mol % of propane in the box 50 (i.e. material balance control volume) of FIG. 3. Using the methane/propane relative volatility, about 10 to 1 as discussed above, it can be estimated that the 5 mol % methane in the feed solvent corresponds to about 50 mol % in the box 50, at the bitumen interface. Thus, the propane concentration at the interface is reduced by 50% and it is reasonable to expect that the heat transfer coefficient is also reduced by 50%. So, a 5 mol % methane concentration in the feed gas both reduces the extraction temperature by about 20 C and reduces the heat transfer coefficient to the bitumen interface by about 50%.

In both FIGS. 7 and 8 there is shown a fracture pressure at about 2800 kPa. It will be understood by those skilled in the art that this value was chosen by way of example only and that the actual fracture pressure will be a function of a number of aspects of the formation such as formation integrity, depth of chamber and the like. Since the present invention is primarily directed to tar sands deposits and since the preferred solvent is propane, there are some deposits which are deep enough to have a frac pressure which is likely greater than the critical pressure for propane. For such deep deposits it may be more efficient o switch to a different solvent, or to operate at pressure below fracture pressures and below the critical pressure for the solvent. However, it is believed that the present invention with propane will be appropriate for a significant portion of the tar sand deposits.

Although the foregoing description includes reference to propane solubility in bitumen, there is no published data currently available for propane solubility in bitumen. The flash calculations (bubble points, compositions etc) used in this specification were performed with a fairly simple thermodynamic model. Thus, some of the "K" values used to calculate equilibria have been estimated. It is believed that the thermodynamic values contained in this specification may differ from values obtained with actual lab data. However, the present invention comprehends such more precise values and it is believed that the values provided herein are if anything conservative. It is believed that the use of lab data will only serve to emphasize the trends shown in FIGS. 4, 5 and 6 and thereby reinforce the conclusions and importance of the invention described in this patent.

It will be understood by those skilled in the art that the material balance control volumes shown schematically in FIGS. 3 and 7 are not intended to be precise, but are more intended to help explain the mechanism that delivers solvent vapour to the bitumen interface and the equilibria that occur at the interface.

It will be further understood by those skilled in the art that the nature of heavy oil and bitumen reservoirs can vary dramatically from location to location. The "typical" conditions described in this patent were specifically chosen to provide a comparison with the insitu recycle processes and Vapex and to show how the present invention is appropriate for a wide range of reservoir conditions. Also as noted earlier, methane was referenced as the primary less condensable gas for convenience, but the present invention comprehends all other less condensable gases that might be present in the reservoir or in the makeup solvent supply.

It will be appreciated by those skilled in the art that the foregoing description is with respect to preferred embodiments of the invention and that many variations and alterations are possible without departing from the scope of the appended claims. Some of these variations have been discussed above and others will be apparent to those skilled in the art.

We claim:

1. A process for recovering hydrocarbons by injecting a condensing solvent into an underground hydrocarbon bearing formation having an extraction chamber with an extraction surface, the process comprising the steps of:
   selecting a solvent;
   heating said solvent;
   injecting said solvent in a vapour form into said formation; and
   maintaining a pressure and a temperature in said extraction chamber such that bubble point conditions are achieved at the extraction surface wherein, as said solvent condenses within the extraction chamber and mobilizes said hydrocarbons, compounds within said extraction chamber which are less condensable than said solvent are carried away with said recovered hydrocarbons in a liquid state to permit said solvent to continue to condense and mobilize said hydrocarbons;
   permitting said hydrocarbons to drain from said chamber by means of gravity, and
   extracting said gravity drained hydrocarbons from said underground formation.

2. An apparatus for recovering hydrocarbons from an underground formation having a gravity drainage extraction chamber with an extraction surface, using a condensing solvent, the apparatus comprising:
   a means to purify a solvent sufficiently to remove less condensable gases than said solvent from said extraction chamber at extraction conditions;
   a means for heating said purified solvent;
   an injector for injecting and delivering said solvent in purified vapour form into said extraction chamber in said formation under pressure to achieve bubble point conditions at said extraction surface;
   a recovery well for recovering a draining liquid blend of said solvent, said less condensable gases and hydrocarbon from said formation; and
   a separator for separating said solvent and said less condensable gases from said hydrocarbon.

3. An apparatus for recovering hydrocarbons from an underground formation using a condensing solvent, as claimed in claim 2, wherein the purifier includes means to remove from said solvent less condensable fractions than said solvent from said solvent.

4. An apparatus for recovering hydrocarbons from an underground formation using a condensing solvent, as claimed in claim 2 wherein said means for purifying a solvent is tolerant to variable flow rates and process interruptions.

5. An apparatus for recovering hydrocarbons from an underground formation using a condensing solvent, as claimed in claim 2 wherein said means for purifying includes one or more distillation columns.

6. An apparatus for recovering hydrocarbons from an underground formation using a condensing solvent, as claimed in claim 2 wherein said means for heating said solvent is located above ground.

7. An apparatus for recovering hydrocarbons from an underground formation using a condensing solvent, as claimed in claim 2 wherein said means for heating said solvent utilizes waste heat energy.

8. An apparatus for recovering hydrocarbons from an underground formation using a condensing solvent, as claimed in claim 2 further including one or more internal flow loops to ensure that a minimum feed flow is available for separation and purification.

9. An apparatus for recovering hydrocarbons from an underground formation using a condensing solvent, as claimed in claim 2 further including a heater to use impurities recovered from said solvent as fuel.

10. An apparatus for recovering hydrocarbons from an underground formation using a condensing solvent, as claimed in claim 2 further including a blender to blend condensates recovered from said purifier in hydrocarbons produced.

11. An apparatus for recovering hydrocarbons from an underground formation using a condensing solvent, the apparatus comprising:
- a solvent recirculating system having
- a means to purify a solvent by removing impurities, including less condensable compounds, from said solvent;
- a flow line to separate said impurities from said solvent recirculating system;
- a means for heating said purified solvent to permit said heat to be delivered to said formation by said condensing solvent;
- an injector for injecting said purified heated solvent into said formation under pressure;
- a recovery well for recovering a liquid blend of solvent, impurities and hydrocarbons from said formation;
- a separator for separating said solvent and said impurities including less condensable compounds from said hydrocarbons, and
- a means from said separator to said means to purify said solvent for said solvent and said less condensable compounds,
- wherein said solvent recirculating system removes less condensable compound impurities from said recirculating solvent before said purified solvent is reused in the formation.

12. An apparatus for recovering hydrocarbons from an underground formation using a condensing solvent as claimed in claim 11 further including an injection well, generally parallel to and spaced apart from said recovery well for delivering said purified solvent to said formation.

13. An apparatus for recovering hydrocarbons from an underground formation using a condensing solvent, as claimed in claim 11, wherein the solvent is propane and said purifier includes means to remove from said solvent less condensable compounds such as butane, methane, ethane, nitrogen and carbon dioxide.

14. An apparatus for recovering hydrocarbons from an underground formation using a condensing solvent, as claimed in claim 11 wherein said means for purifying includes one or more distillation columns.

15. An apparatus for recovering hydrocarbons from an underground formation using a condensing solvent, as claimed in claim 11 wherein said means for heating said solvent utilizes waste heat energy.

16. An apparatus for recovering hydrocarbons from an underground formation using a condensing solvent, as claimed in claim 11 further including one or more internal flow loops to ensure that a minimum feed flow is available for separation and purification.

17. An apparatus for recovering hydrocarbons from an underground formation using a condensing solvent, as claimed in claim 11 further including a heater to use impurities recovered from said solvent as fuel.

18. An apparatus for recovering hydrocarbons from an underground formation using a condensing solvent, as claimed in claim 11 further including a mixer to blend condensates recovered from said purifier into said hydrocarbons produced.

* * * * *

UNITED STATES PATENT AND TRADEMARK OFFICE
CERTIFICATE OF CORRECTION

PATENT NO.        : 7,363,973 B2                                      Page 1 of 1
APPLICATION NO. : 11/063050
DATED             : April 29, 2008
INVENTOR(S)       : Nenniger and Nenniger It is certified that error appears in the above-identified patent and that said Letters Patent is hereby corrected as shown below:

Title page add Item:

-- (73)  Assignee: N-Solv Corporation, Calgary, Alberta, Canada --

Signed and Sealed this

Eighteenth Day of November, 2008

JON W. DUDAS
*Director of the United States Patent and Trademark Office*